US011751307B2

(12) United States Patent
Leitner et al.

(10) Patent No.: US 11,751,307 B2
(45) Date of Patent: Sep. 5, 2023

(54) METHOD AND APPARATUSES FOR CONTROLLING THE OUTPUT VOLTAGE OF A VOLTAGE REGULATOR

(71) Applicant: Elmos Semiconductor SE, Dortmund (DE)

(72) Inventors: Carsten Leitner, Berlin (DE); Andre' Krieger, Berlin (DE); Christian Schmitz, Castrop-Rauxel (DE); Thomas Geistert, Warstein (DE)

(73) Assignee: Elmos Semiconductor SE, Dortmund (DE)

( * ) Notice: Subject to any disclaimer, the term of this patent is extended or adjusted under 35 U.S.C. 154(b) by 5 days.

(21) Appl. No.: 17/607,050

(22) PCT Filed: May 20, 2020

(86) PCT No.: PCT/DE2020/100438
§ 371 (c)(1),
(2) Date: Oct. 28, 2021

(87) PCT Pub. No.: WO2020/233752
PCT Pub. Date: Nov. 26, 2020

(65) Prior Publication Data
US 2022/0210886 A1    Jun. 30, 2022

(30) Foreign Application Priority Data
May 23, 2019   (DE) ..................... 10 2019 113 864.7

(51) Int. Cl.
*H05B 45/347*   (2020.01)
*H05B 45/3725*   (2020.01)

(52) U.S. Cl.
CPC ....... *H05B 45/347* (2020.01); *H05B 45/3725* (2020.01)

(58) Field of Classification Search
CPC ... H05B 45/347; H05B 45/3725; H05B 45/46
See application file for complete search history.

(56) References Cited

U.S. PATENT DOCUMENTS

| 7,157,866 B2 | 1/2007 | Komiya et al. |
| 8,319,449 B2 | 11/2012 | Hoogzaad et al. |
| (Continued) | | |

FOREIGN PATENT DOCUMENTS

| DE | 10318780 A1 | 12/2004 |
| DE | 102006055312 A1 | 8/2007 |
| (Continued) | | |

OTHER PUBLICATIONS

International Search Report dated Aug. 3, 2020 re PCT/DE2020/100438 (4 pages).

*Primary Examiner* — Daniel D Chang
(74) *Attorney, Agent, or Firm* — Mindful IP Law; Michael J. McCandlish

(57) ABSTRACT

A device comprises a voltage regulator, circuits, a voltage-to-current converter, a control bus, a resistor and a resistor network. Each of the circuits has at least one LED connector and one LED driver. Each of the circuits has a measuring circuit for detecting voltage differences between the potentials of LED terminals and a reference potential. Further, each of the circuits includes a local controller. The local controller withdraws a current from the control bus in dependence on the detected voltage differences. Bias current sources inject bias currents into the control bus in form of a sum current of the injected bias currents. The resistor performs a current-to-voltage conversion of the sum current to a control voltage. The voltage-to-current converter converts the control voltage into a current. The resistor network converts the current into a voltage value. An output voltage of the voltage regulator depends on the voltage value.

4 Claims, 1 Drawing Sheet

(56) References Cited

U.S. PATENT DOCUMENTS

| | | |
|---|---|---|
| 8,519,632 B2 | 8/2013 | Krespach et al. |
| 2007/0139317 A1 | 6/2007 | Martel et al. |
| 2008/0122383 A1 | 5/2008 | Katoh |
| 2009/0212717 A1* | 8/2009 | Trattler ................ H05B 45/46 315/297 |
| 2009/0230874 A1* | 9/2009 | Zhao .................... H05B 45/347 315/192 |
| 2010/0026209 A1 | 2/2010 | Liu |
| 2010/0201278 A1 | 8/2010 | Zhao |
| 2011/0012521 A1* | 1/2011 | Byun .................... H05B 45/46 315/186 |
| 2011/0043114 A1 | 2/2011 | Hsu et al. |
| 2012/0268012 A1 | 10/2012 | Walker |
| 2022/0210889 A1* | 6/2022 | Leitner ............. H05B 45/3725 |

FOREIGN PATENT DOCUMENTS

| | | |
|---|---|---|
| DE | 102005028403 B4 | 11/2013 |
| EP | 1499165 B1 | 1/2005 |
| EP | 2293165 A1 | 3/2011 |
| EP | 2600695 B1 | 6/2013 |
| KR | 20110123864 A | 11/2011 |
| WO | 2013030047 A1 | 3/2013 |

\* cited by examiner

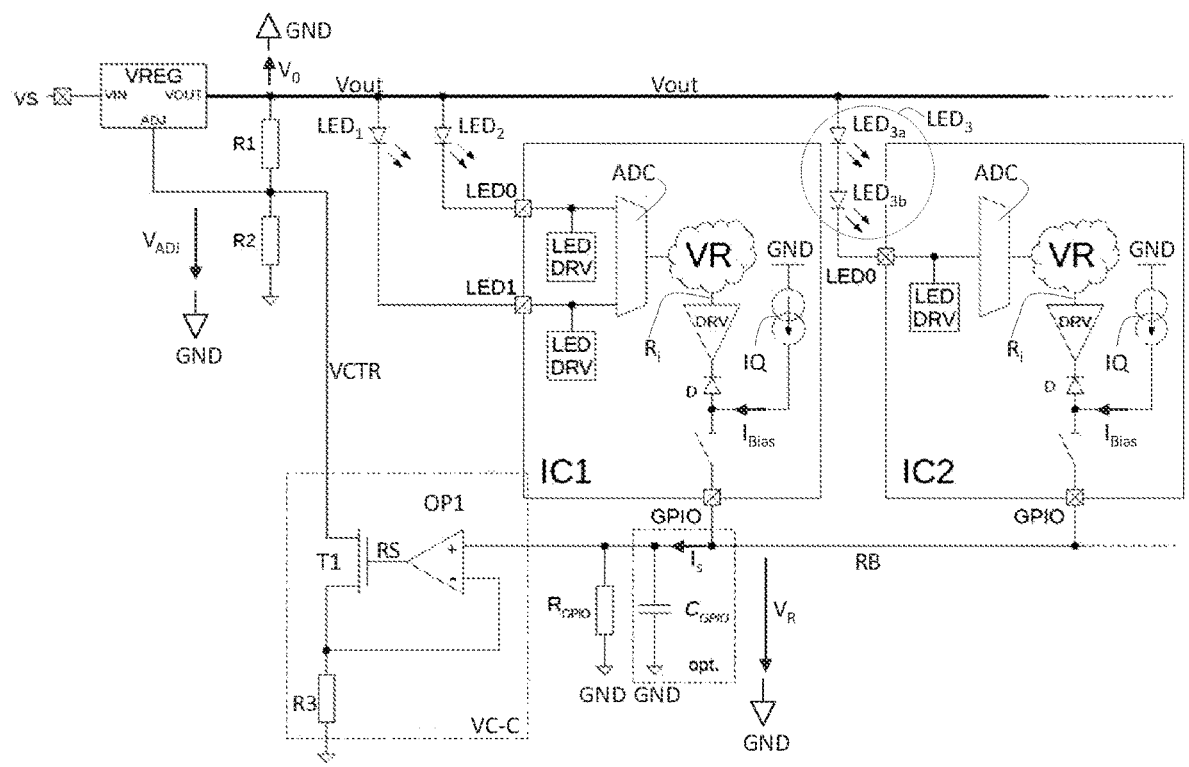

METHOD AND APPARATUSES FOR CONTROLLING THE OUTPUT VOLTAGE OF A VOLTAGE REGULATOR

CROSS-REFERENCE TO RELATED APPLICATIONS

This application is a national stage of, and claims priority to, Patent Cooperation Treaty Application No. PCT/EP2020/100438, filed on May 20, 2020, which application claims the priority of German Patent Application 10 2019 113 864.7 of May 23, 2019, the contents of which are incorporated into the subject matter of the present application by reference.

BACKGROUND

LED lighting is increasingly being used in the automotive industry. The problem here is that the light-emitting diodes do not all have the same threshold voltage, but the LEDs are all supplied with electrical energy from a voltage source. The luminosity of the LEDs is typically set via respective power sources. These power sources drop electrical power that has to be minimized. The voltage source is preferably an energetically favorable switching converter, such that the switching converter generates little waste heat. A problem appears in how several integrated circuits, each typically having several LED current sources, can regulate such an upstream voltage source in an efficient and easy way.

For example, the following documents from the technical field of the disclosure are known from the prior art:

A drive device for a colored background light is known from DE 10 2006 055 312 A1. Each LED string is connected with one voltage source and one current source in a complex way to circumvent the problem of the combined control.

DE 10 318 780 A1 discloses a control circuit for generating two or more regulated or controlled constant currents through one consumer each, e.g. a LED, with a common in the size adjustable supply voltage supplying the individual constant current sources. The technical teaching of DE 10 318 780 A1 is characterized in that the size of the supply voltage is adjusted to the constant current source which generally or at the respective point in time feeds the greatest total impedance and thus requires the greatest supply voltage. The amount of the supply voltage is set so minimally that the amount of the voltage occurring across one of the power sources is just sufficient for its operation. The regulation of several LED branches is done by a Diode selection control, which selects a minimum voltage of a power source.

An electronic device for controlling a light-emitting semiconductor device is known from U.S. Pat. No. 8,319,449 B2. The device of U.S. Pat. No. 8,319,449 B2 comprises
  a feedback port configured and arranged to receive a detection value,
  an output port that is configured and arranged to supply the light emitting device responsive to a current source and
  a control circuit electrically decoupled or isolated from the light emitting semiconductor device.

The control circuit is configured and arranged in such a way that, in response to the detection value received from the controller, it controls a switched-mode power supply via the output port in order to supply the semiconductor light-emitting device. The controller of the switched-mode power supply is supplied via the feedback input, which indicates a voltage across the current source in order to determine a current through the light-emitting semiconductor device. The switched-mode power supply is controlled in such a way that the voltage across the current source is kept at the minimum level necessary for device operation. A circuit selects the minimum current source voltage as the control voltage for the voltage source.

An LED driver circuit for controlling an LED light source is known from US 2010/026209 A1. The LED driver circuit of US 2010/0 026 209 A1 comprises a regulator which is coupled to the LED light source in order to supply it with an output voltage, a current source which is coupled to the LED light source in order to adjust its drive current; and a controller coupled to the current source and the regulator for sensing a voltage of the current source to generate a control signal for the regulator to regulate the output voltage. The technical teaching of US 2010/0 026 209 A1 does not solve the problem of how several controllers can be coupled with one another with little effort.

A drive device for a light-emitting element is known from U.S. Pat. No. 7,157,866 B2. According to the technical teaching of U.S. Pat. No. 7,157,866 B2, this includes a booster circuit for increasing a given power supply voltage in order to generate a required booster voltage at an output end of the booster circuit, a voltage switching circuit for selectively outputting the power supply voltage or step-up voltage at one switching voltage output end of the voltage switching circuit, a first driver connected in series with a first light emitting element group and connected between the switched voltage output end and a reference voltage node, the first driver being controlled by a first command signal, and a second driver connected in series with a second light emitting element group resulting in a larger voltage drop than the first group, and connected between the output end of the step-up voltage output and the reference voltage node, the second driver being controlled by a second command signal. The technical teaching of U.S. Pat. No. 7,157,866 B2 does not solve the problem of how several controllers can be coupled to one another with little effort.

EP 1 499 165 B1 discloses a load driver device for driving multiple loads, each of which is connected in series with an associated constant current source, wherein the load drive device comprises a power supply circuit providing an output voltage for the multiple loads that can be achieved by converting an input voltage into the output voltage. The technical teaching of EP 1 499 165 B1 is characterized in that the constant current sources are of an adjustable type, and each of the constant current sources is able to supply an adjustable constant output current for the corresponding load; and in that the output voltage is controlled to hold constant a lowest one of the voltages at the common node between each of the multiple loads and its respective constant current source. The technical solution of the EP 1 499 165 B1 is similar to one of the solutions described above. The technical teaching of EP 1 499 165 B1 also does not solve the problem of how several controllers can be coupled to one another with little effort. The voltage signals make the solution very susceptible to EMC signals and potential misalignments.

A control device for at least one series connection of several light-emitting diodes is known from U.S. Pat. No. 8,519,632 B2. A control device according to the technical teaching of U.S. Pat. No. 8,519,632 B2 comprises a voltage regulating unit able to regulate the operating voltage for the at least one series connection of the light-emitting diodes, and a current control unit for each of the at least one series connection of light-emitting diodes, wherein the current control unit is set up to regulate the current through the specific series connection of light-emitting diodes, and wherein the current control unit is connected to the voltage control unit to transmit a current control signal to the voltage control unit. The voltage regulating unit contains a voltage divider, wherein the voltage divider is connected between an operating voltage of the at least one series connection of light-emitting diodes and ground, wherein the operating voltage is provided by the voltage regulating unit. A tap of the voltage divider and an input of a first control stage are connected to an output of a second control stage, so that if the current control signal exceeds a predetermined voltage, a voltage at the tap of the voltage divider is reduced. The technical teaching of U.S. Pat. No. 8,519,632 B2 also uses voltage signals that are selected by diodes (reference numbers 51, 52, 53 of U.S. Pat. No. 8,519,632 B2). The voltage signals make the solution very susceptible to EMC signals and potential misalignments.

A current source arrangement is known from DE 10 2005 028 403 B4, in which the voltage regulator uses a voltage signal to signal the voltage dropping below a minimum voltage drop in one of the power sources for supplying an LED string is communicated. The voltage signals make the solution very susceptible to EMC signals and potential misalignment.

A solution is known from WO 2013/030 047 A1 in which, for each current source, a voltage signal corresponding to the voltage drop across this current source is transmitted analogously to a central unit and there transmitted in a voltage control signal for controlling a common power supply. The voltage signals make the solution very susceptible to EMC signals and potential misalignments.

US 2008/0 122 383 A1 discloses an LED driver for feeding electrical current into an LED circuit, which consists either of a single LED or a plurality of LEDs that are connected to one another in series, wherein the LED Driver sets a constant current circuit part that is serially connected to the LED circuit and a current to a predetermined value flowing from an upstream to a downstream side thereof, a voltage setting part that is serially connected to the constant current circuit part, wherein the voltage setting part adjusts a potential difference between the upstream and downstream sides with a switching regulator. The technical teaching of US 2008/0 122 383 A1 also does not solve the problem of how several controllers can be coupled with one another with little effort.

Also from US 2011/0 043 114 A1, US 2007/0 139 317 A1, US 2009/0 230 874 A1, US 2012/0 268 012 A1, EP 2 600 695 B1 and US 2011/0 012 521 A1 solutions are known in which, for each current source, a voltage signal is transmitted analogously to a central unit corresponding to the voltage drop across this current source. There, the voltage signal is transmitted in a voltage control signal for controlling a common voltage supply. The voltage signals make the solution very susceptible to EMC signals and potential misalignments.

A solution is known from US 2010/0201278 A1 in which the controllers are connected in a loop. Each controller determines the voltage values of the voltage drops across its LED power sources and compares the minimum value of these voltage values with a voltage value at a voltage value input. If the own minimum voltage value is less than this voltage value at the voltage value input, the respective controller sends its minimum voltage value to the voltage value input of the following controller. If the own minimum voltage value is greater than this voltage value at the voltage value input, the respective controller sends this voltage value at the voltage value input to the voltage value input of the downstream controller. The voltage signals make the solution very susceptible to EMC signals and potential misalignments.

US 2011/0 012 521 A1 requires the reference values to be transmitted over a plurality of lines (reference symbols Vf1~Vfi, Vfi+1~Vf2i, Vf2i+1~Vf3i in FIG. 1 of US 2011/0 012 521 A1). This results in a considerable amount of wiring and a considerable number of rules. The evaluation is carried out in the technical teaching of US 2011/0 012 521 A1 by a Microcomputer, which results in the need for an analog-to-digital converter and a PWM unit for digital-to-analog conversion.

US 2010/0201278 A1 discloses a method and a device for regulating an output voltage. In the technical teaching of US 2010/0201278 A1, each LED driver determines a minimum voltage value for the voltage drops across its LED power sources, compares this voltage drop value with its predecessor in a chain and transmits the minimum voltage value of these two voltage values to its successor. In the event of a driver failure, the control system will fail completely.

SUMMARY

The proposal is therefore based on the object of creating a solution which does not have the above disadvantages of the prior art and has further advantages.

This is achieved by a method and a device according to the independent claims.

Disclosed are a method and associated devices for regulating the output voltage ($V_O$) at the output ($V_{out}$) of a voltage regulator (VREG) for supplying a lighting device with electrical energy, wherein the lighting device comprises several, but at least two circuits (IC1, IC2) with at least one LED Group ($LED_1$, $LED_2$, $LED_3$) with an associated LED power source (LED DRV), and wherein each circuit (IC1, IC2) is supplied with electrical energy.

Here, LED is a light-emitting diode. An LED group can be an interconnection of several LEDs connected in parallel and/or in series, wherein the LED group has a first terminal and a second terminal and emits light when voltage is applied between the first terminal and the second terminal in correct polarity.

The voltage regulation is preferably carried out as shown in FIG. 1. Disclosed is a current-controlled voltage regulator, which comprises an actual voltage-controlled Voltage regulator (VREG), as it is widely known from patent literature, and a surrounding circuitry (R1, R2, VC-C, $R_{GPIO}$).

The proposed device comprises several, at least two, integrated circuits (IC1, IC2). In the following, these integrated circuits (IC1, IC2) are also referred as "ICs".

The individual ICs (IC1, IC2) feed an only essentially equal bias current ($I_{Bias}$) into a control bus (RB) via a respective control bus connection (GPIO) of their terminals by means of a current source (IQ) associated with the respective IC (IC1, IC2). For example, this bias current ($I_{Bias}$) is set at the factory, so that it deviates from IC to IC by no more than 25%, preferably no more than 10%, preferably no more than 5%, preferably no more than 2% from IC to IC within the group of ICs. Experience shows that a deviation of 10% is possible for many applications without destroying the operability. However, it is recommended to carry out these currents as precisely as possible. The sum current ($I_S$) from the current sum of the injected bias currents ($I_{Bias}$) of all integrated circuits (IC) connected to the control bus (RB) drops against ground via a resistor ($R_{GPIO}$). The control voltage (VR) generated from the current sum of the injected bias currents ($I_{Bias}$) of all integrated circuits (IC)

connected to the control bus (RB) is amplified to a control signal (RS) via the amplifier (OP1). The output of the amplifier (OP1) in the form of the control signal (RS) is connected to the control input of a first transistor (T1). This first transistor (T1) is connected as a source follower. The negative feedback resistor of this source follower is a third resistor (R3). Thus, the control voltage ($V_R$) determines the current through the negative feedback resistor (R3). This current is the value of the voltage control signal (VCTR). This current of the voltage control signal (VCTR) also flows through a first resistor (R1) of a voltage divider consisting of a first resistor (R1) and a second resistor (R2), since the input of the voltage regulator (VREG) is preferably high impedance compared to these resistors (R1, R2)). Therefore, the input resistance of the voltage regulator (VREG) can typically be neglected. The second resistor (R2) thereby conducts a further current to ground (i.e., the reference potential (GND)). The sum current of the current through the negative feedback resistor, the current through third resistor (R3), and the current through the second resistor (R2) also flows through the first resistor (R1). Thus, the potential difference at the input (ADJ) of the voltage regulator (VREG) with respect to the reference potential (GND) depends on the output potential of the voltage regulator output ($V_{out}$) of the voltage regulator (VREG) minus the voltage that drops across the first resistor (R1). The voltage regulator (VREG) provides an output voltage ($V_{out}$) versus ground potential that depends on this input voltage difference (potential at the input (ADJ) of the voltage regulator (VREG) versus the reference potential (GND)). The nature of the voltage regulator (VREG) can be left open here. For example, it may be a linear regulator and/or a switching regulator. This output voltage ($V_{out}$) supplies electrical energy to the LEDs ($LED_1$, $LED_2$, $LED_{3a}$, $LED_{3b}$) of the LED groups ($LED_1$, $LED_2$, $LED_3$). Different from the example of the FIGURE, the chain of integrated circuits (IC1, IC2) for supplying multiple LED groups may include more than one and/or more than two and/or more than three and or even more integrated circuits (IC1, IC2) and/or more than one LED group per integrated circuit (IC1, IC2) of these integrated circuits. An LED group ($LED_1$, $LED_2$, $LED_3$) in this sense can thereby consist of a single LED but also of an interconnection, in particular of a parallel and/or series connection of several LEDs. In the following, the term LED therefore also includes such interconnections of several LEDs to form an LED group, even if the term is used in the singular. In the case of interconnections of several LEDs, similar interconnections are clearly preferred for driving by the different integrated circuits (IC1, IC2). The current through each of the LED groups or LEDs ($LED_1$, $LED_2$, $LED_{3a}$, $LED_{3b}$) is respectively controlled by a respective current source associated with that LED group ($LED_1$, $LED_2$, $LED_3$) in the form of a respective LED driver (LED DRV) of a circuit (IC1, IC2). This current source, the LED driver (LED DRV), is preferably part of the respective integrated circuit (IC1, IC2). An integrated circuit (IC1, IC2) can comprise several such current sources, LED drivers (LED DRV) and thus supply several LED groups with electrical energy. The voltage drop across each LED group ($LED_1$, $LED_2$, $LED_3$), which is supplied with electrical energy by an LED driver (LED DRV) of an integrated circuit (IC1, IC2), is detected by an analog-to-digital converter (ADC) of the respective integrated circuit (IC1, IC2) as the potential of the corresponding LED terminal ($LED_0$, $LED_1$) of the respective integrated circuit (IC1, IC2) with respect to the reference potential (GND). For this purpose, the analog-to-digital converter (ADC) of the respective integrated circuit (IC1, IC2) preferably has a multiplexer in order to be able to switch between the different LED groups ($LED_1$, $LED_2$, $LED_3$), which are supplied with electrical energy by the LED drivers (LED DRV) of the integrated circuit (IC1, IC2), in time-division multiplex. Such an integrated circuit (IC1, IC2) can thus be provided and designed to supply n LED groups ($LED_1$ to $LED_n$) with electrical energy via typically n LED connections (LED0 to LED(n−1)) by means of n LED drivers (LED DRV) of this integrated circuit (IC1, IC2), where n is a positive integer. However, it is conceivable to lead a connection node to the outside via a larger number of connections. For the purposes of this document, connections of an integrated circuit that are short-circuited in this way are considered to be a single connection, since the electrical function is to be decisive here and not the mechanical realization. In the example of FIG. 1, n=3. Therefore, in the following, the indices "n" with respect to FIG. 1 are to be understood as with an index "3". Each LED group of the n LED groups ($LED_1$ to $LED_n$) can consist of a single LED ($LED_1$, $LED_2$), as already described, but also of interconnections ($LED_3$) of several LEDs ($LED_{3a}$, $LED_{3b}$). The n measured values of the analog-to-digital converter (ADC) for the n LED groups ($LED_1$ to $LED_n$) are the input values for the one respective local controller (VR) of the respective integrated circuit (IC1, IC2). The local controller (VR) thus receives n voltage values for the n potentials of the n LED terminals (LED1, LED0) of the integrated circuit (IC1, IC2) with respect to a reference potential (GND). This local controller (VR) generates according to an algorithm, for example by selecting the minimum voltage value from the n potential differences between the said n measured values of the analog-to-digital converter (ADC) for the potentials at the n LED terminals of the n LED groups ($LED_1$ to $LED_n$) of the integrated circuit (IC1, IC2) with respect to the reference potential (GND) as a local control value, from the control deviations of these voltage drops of the respective current sources (LED DRV) of the respective LED groups, i.e. from the n potential differences between the said n measured values of the analog-to-digital converter (ADC) for the potentials at the n LED terminals of the n LED groups ($LED_1$ to $LED_n$) of the integrated circuit (IC1, IC2) with respect to the reference potential (GND), an internal control signal ($R_i$).

Part of the local controller (VR) of an integrated circuit (IC1, IC2) is in each case a digital-to-analog converter of this integrated circuit, which controls at least one driver (DRV), which can also be part of the digital-to-analog converter of the integrated circuit (IC1, IC2). The local controller (VR) of the integrated circuit (IC1, IC2) is now designed in such a way that the respective driver or drivers (DRV) of an integrated circuit (IC1, IC2) now each draw an additional, respective current from the control bus (RB) when the determined minimum voltage drop of all voltage drops across the respective current sources (LED DRV) of this integrated circuit (IC1, IC2) between the respective LED connection (LED0, LED1) and the reference potential is too low, i.e. its absolute value is below a predefined threshold value. A diode (D) prevents a current from being injected by the driver (DRV) into the control bus (RB) and only allows a current to be drawn from the control bus (RB).

The various current sources (IQ) and drivers (DRV) of the different bus components (integrated circuits (IC1, IC2)) operate on the common control bus (RB).

The control bus (RB) preferably always has the lowest voltage against the reference potential (GND).

When the potential is shifted, the lowest output voltage of the driver (DRV) with the lowest output potential always determines the voltage on the control bus (RB) against the reference potential.

For continuous-time control, it is necessary that the sampling period of the LED terminals (LED0, LED1) of the integrated circuits (IC1, IC2) by the analog-to-digital converters (ADC) is selected to be much smaller than the control time constant for the subsequent control loop, in order to keep the resulting control error small. For this purpose, the resistor ($R_{GPIO}$) for converting the sum current ($I_s$) into a voltage can be replaced by a more complex network of complex components such as resistors, capacitors and coils. In the example of FIG. 1, an exemplary integration capacitor ($C_{GPIO}$) is optionally provided to increase the time constant and thus reduce quantization errors.

BRIEF DESCRIPTION OF THE DRAWINGS

FIG. 1 shows an exemplary device for regulating a voltage regulator for supplying at least two LED groups.

DESCRIPTION

The disclosure relates to a method for regulating the output voltage ($V_0$) at the output ($V_{out}$) of a voltage regulator (VREG) for supplying a lighting device with electrical energy, wherein the lighting device comprises several, but at least two, circuits (IC1, IC2) with at least one LED group ($LED_1$, $LED_2$, $LED_3$) and an appropriate current source (LED DRV) per circuit (IC1, IC2).

The method, shown in FIG. 1, comprises at least the following steps:

First, a supply voltage ($V_0$) is generated by means of the voltage regulator (VREG) at the output ($V_{out}$) of this voltage regulator (VREG).

Next, a respective LED group current ($I_{LED1}$, $I_{LED2}$, $I_{LED3}$) is set by the LED groups ($LED_1$, $LED_2$, $LED_3$) by means of a current source (LED DRV) for each LED group ($LED_1$, $LED_2$, $LED_3$). In the example of FIG. 1, the LED groups ($LED_1$, $LED_2$, $LED_3$) are distributed on two circuits (IC1, IC2). Devices having more than two circuits and more than three LED groups are expressly intended to be included in the claims and to be considered as disclosed herein.

Next, the detection of the respective voltage drop across respective current sources (LED DRV) of the LED groups (LED1, LED2, LED3) is performed as the respective voltage drop value of this current source (LED DRV). This is preferably done in each of the circuits (IC1, IC2) for preferably each of the current sources (LED DRV).

Next, in preferably each circuit (IC1, IC2), a voltage drop value of the voltage drop values of the current sources (LED DRV) of this circuit is selected as the characteristic voltage drop value of this circuit from among the voltage drop values determined for this circuit. Thus, one characteristic voltage drop value is preferably obtained for each circuit. It is performed as nothing else than determining a respective voltage drop value of a current source (LED DRV) of each circuit (IC1, IC2) from the voltage drop values of the current sources (LED DRV) of that respective circuit (IC1, IC2) as a characteristic voltage drop value of that circuit (IC1, IC2). Preferably, the characterizing voltage drop value of this circuit (IC1, IC2) is the minimum voltage drop value of the determined voltage drop values of this circuit (IC1, IC2).

Next, each of the circuits (IC1, IC2) draws an electric current associated with it, its draw current, from a control bus (RB). This represents a withdrawal of a respective withdrawal current of the respective circuit (IC1, IC2) from a control bus (RB) by each of these circuits (IC1, IC2). The amount of this respective withdrawal current of the respective circuit (IC1, IC2) is to depend thereby on the deviation of its characteristic voltage drop value from a set value. This setpoint is preferably common to all circuits and thus selected or set the same for all circuits (IC1, IC2) within a tolerance interval.

Preferably, each circuit (IC1, IC2) feeds a substantially constant bias current ($I_{Bias}$) into the control bus (RB). However, a single injection is usually sufficient for proper operation. Theoretically, solutions without bias current injection are also conceivable with greater circuitry effort, but are not preferred here.

By feeding the current into the control bus (RB), all extraction currents and at least one optional constant bias current ($I_{Bias}$) are summed up to a common sum current ($I_S$). Thus is disclosed a low-effort, easy and inexpensive to implement generation of a common sum current and its subsequent use as a control signal. The output voltage ($V_O$) of the voltage regulator (VREG) is then regulated at its output ($V_{out}$) as in dependence of the sum current ($I_S$). In the example of FIG. 1, several current-voltage conversions and voltage-current conversions are performed for circuit reasons. Theoretically, however, direct control of the voltage regulator with this current signal is conceivable if the voltage regulator has a current input for controlling its reference value. In the example of FIG. 1, however, a voltage input for the voltage regulator (VREG) is assumed.

The corresponding device for supplying several, but at least two LED groups ($LED_1$, $LED_2$, $LED_3$) with electrical energy therefore preferably comprises a voltage regulator (VREG), at least two circuits (IC1, IC2), a voltage-to-current converter (VC-C), a control bus (RB), a resistor ($R_{GPIO}$) and a resistor network (R1, R2). Each of the circuits (IC1, IC2) preferably has at least one LED connection (LED0, LED1) for at least one LED group ($LED_1$, $LED_2$, $LED_3$), at least one LED driver (LED DRV) per LED group ($LED_1$, $LED_2$, $LED_3$) for supplying power to this LED group ($LED_1$, $LED_2$, $LED_3$) via an LED connection (LED0, LED1) associated with this LED group ($LED_1$, $LED_2$, $LED_3$) and at least one measuring means (ADC) of this circuit (IC1, IC2) for detecting the voltage differences between the potentials of LED connections (LED0, LED1) of this circuit (IC1, IC2) and a reference potential (GND). Furthermore, each of the circuits (IC1, IC2) has a local controller (VR) which, by means of at least one driver (DRV), draws a current from the control bus (RB) depending on the voltage differences detected by its measuring means (ADC). One or more bias current sources (IQ) inject one or more bias currents ($I_{Bias}$) into the control bus (RB) in the form of a sum current of the injected bias currents ($I_{Bias}$) in order to set the operating point correctly. The resistor ($R_{GPIO}$) performs a current-to-voltage conversion of the sum current ($I_S$) into a control voltage ($V_R$). The voltage-to-current converter (VC-C) converts the control voltage ($V_R$) into a current of a voltage control signal (VCTR). The resistor network (R1, R2) converts the current of the voltage control signal (VCTR) into a voltage value ($V_{ADJ}$) The output voltage ($V_O$) of the voltage regulator (VREG) depends on the voltage value ($V_{ADJ}$), so that this then closes the control loop. Preferably, the dependencies are linear.

The control chain of FIG. 1 can be massively shortened.

The corresponding device simplified in a first step for supplying several, but at least two LED groups ($LED_1$, $LED_2$, $LED_3$) with electrical energy therefore preferably comprises a voltage regulator (VREG), at least two circuits (IC1, IC2), a control bus (RB), and a resistor ($R_{GPIO}$). Each of the circuits (IC1, IC2) preferably has at least one LED connection (LED0, LED1) for at least one LED group ($LED_1$, $LED_2$, $LED_3$), at least one LED driver (LED DRV) per LED group ($LED_1$, $LED_2$, $LED_3$) for supplying power to this LED group ($LED_1$, $LED_2$, $LED_3$) via the LED connection (LED0, LED1) associated with this LED group ($LED_1$, $LED_2$, $LED_3$) and at least one measuring means (ADC) of this circuit (IC1, IC2) for detecting the voltage differences between the potentials of LED connections (LED0, LED1) of this circuit (IC1, IC2) and a reference potential (GND). Furthermore, each of the circuits (IC1, IC2) has a local controller (VR) which, by means of at least one driver (DRV), draws a current from the control bus (RB) depending on the voltage differences detected by its measuring means (ADC). One or more bias current sources (IQ) inject one or more bias currents ($I_{Bias}$) into the control bus (RB) in the form of a sum current of the injected bias currents ($I_{Bias}$) in order to set the operating point correctly. The resistor ($R_{GPIO}$) performs a current-voltage conversion of the sum current ($I_S$) into a control voltage ($V_R$). The output voltage ($V_O$) of the voltage regulator (VREG) depends on the voltage value of the control voltage ($V_R$), so that this then closes the control loop. Preferably, the dependencies are linear.

This control chain can be further shortened.

The corresponding device simplified in a second step for supplying electrical energy to several, but at least two LED groups ($LED_1$, $LED_2$, $LED_3$) preferably comprises a voltage regulator (VREG), at least two circuits (IC1, IC2), and a control bus (RB). Each of the circuits (IC1, IC2) preferably has at least one LED connection (LED0, LED1) for at least one LED group ($LED_1$, $LED_2$, $LED_3$), at least one LED driver (LED DRV) per LED group ($LED_1$, $LED_2$, $LED_3$) for supplying power to this LED group ($LED_1$, $LED_2$, $LED_3$) via the LED connection (LED0, LED1) associated with this LED group ($LED_1$, $LED_2$, $LED_3$) and at least one measuring means (ADC) of this circuit (IC1, IC2) for detecting the voltage differences between the potentials of LED connections (LED0, LED1) of this circuit (IC1, IC2) and a reference potential (GND). Furthermore, each of the circuits (IC1, IC2) has a local controller (VR) which, by means of at least one driver (DRV), draws a current from the control bus (RB) depending on the voltage differences detected by its measuring means (ADC). One or more bias current sources (IQ) feed one or more bias currents ($I_{Bias}$) in the form of a sum current ($I_S$) of the fed bias currents ($I_{Bias}$) into the control bus (RB) in order to set the operating point correctly. The output voltage ($V_O$) of the voltage regulator (VREG) depends on the current value of the sum current ($I_S$), so that this then closes the control loop. Preferably, the dependencies are linear. A current-controlled voltage regulator is required here.

A device according the disclosure allows a regulation of the voltage regulator (VREG) in a simple manner in order to supply more complex LED arrangements supplied with electrical energy from several circuits. It was recognized that this is particularly easy with a current-controlled voltage regulator. Here, the total current ($I_s$) is the actual value signal and the input of the voltage-to-current converter (VC-C) is the exemplary input of a current controlled voltage regulator advanced by a said component (VREG, R1, R2, VC-C). In contrast to the state of the art, the construction is particularly robust against EMC radiation and potential offset due to the current-controlled signal.

LIST OF REFERENCES

ADC analog-to-digital converter, also known as measuring equipment
ADJ Control input of the voltage regulator (VREG) for the voltage control signal (VCTR)
$I_{ADJ}$ additional current
$I_{Bias}$ Constant current of the respective bias current source (IQ), which is supplied via the control bus connection of the respective integrated circuit (IC1, IC2) is fed into the control bus (RB). The bias current is preferably a current that is constant over time for setting the operating point of the proposed device.
IC1 first integrated circuit
IC2 second integrated circuit
IQ bias current source of an integrated circuit (IC1, IC2)
$I_S$ sum current of the fed bias currents ($I_{Bias}$) of all integrated circuits (IC) connected to the control bus (RB)
GND reference potential
GPIO control bus connection of the associated integrated circuit (IC1, IC2)
OP1 amplifier
$LED_1$ first LED; first group of LEDs
$LED_2$ second LED; second group of LEDs
$LED_3$ third LED; third group of LEDs
$LED_{3a}$ first LED of the third LED group ($LED_3$)
$LED_{3b}$ second LED of the third LED group ($LED_3$)
LED0 first LED connection
LED1 second LED connection
LED DRV LED driver
R1 first resistance
R2 second resistance
R3 third resistor
RB control bus
$R_i$ internal control signal
RS control signal
$R_{GPIO}$ resistance to convert the sum current ($I_S$) into a voltage
T1 first transistor
$V_O$ Output voltage of the voltage regulator (VREG) at his voltage regulator output ($V_{out}$) against the reference potential (GND)
$V_{ADJ}$ Voltage value of the voltage control signal (VCTR) against a reference potential (GND)
VC-C voltage-to-current converter (external voltage to current converter), which is preferably not part of the integrated circuits (IC1, IC2) and/or of the voltage regulator (VREG) and which can consist, for example, of a first transistor (T1), an amplifier (OP1) and a third resistor (R3).
VCTR voltage control signal
$V_R$ Control voltage at the resistor ($R_{GPIO}$)
VR local controller of an associated integrated circuit (IC1, IC2)
VREG voltage regulator
$V_{out}$ voltage regulator output of the voltage regulator (VREG)

LIST OF CITED DOCUMENTS

DE 10318780 A1
DE 102005028403 B4
DE 102006055312 A1
EP 1499165 B1
EP 2600695 B1
U.S. Pat. No. 7,157,866 B2
U.S. Pat. No. 8,319,449 B2

U.S. Pat. No. 8,519,632 B2
US 2007/0139317 A1
US 2008/0122383 A1
US 2009/0230874 A1
US 2010/0026209 A1
US 2010/0201278 A1
US 2011/0012521 A1
US 2011/0043114 A1
US 2012/0268012 A1
WO 2013/030047 A1

What is claimed is:

1. A method for regulating an output voltage at an output of a current-controlled voltage regulator for supplying a lighting device with electrical energy, wherein the lighting device includes at least two circuits, the at least two circuits including a first circuit and a second circuit,
wherein each of the at least two circuits is constructed to supply more than one LED group with electrical energy by a current source associated with the LED group, and
wherein the current source is a LED driver,
the method comprising:
generating the output voltage by the current-controlled voltage regulator at the output;
supplying the LEDs of the LED groups using the output voltage;
setting of a first LED group current through the more than one LED group by the current source of the first circuit associated with the respective LED group of the first circuit;
setting of a second LED group current through the at least one LED group by the current source of the second circuit associated with the respective LED group of the second circuit;
if necessary, setting of a third LED group current through an at least one further LED group by the current source of a further circuit associated with this further LED group;
detecting respective voltage drops across the respective of the LED groups as respective voltage drop values of the current source within the respective circuits, wherein a separate voltage drop value is detected for each current source;
selecting the respective voltage drop value of one of the respective current sources of each circuit from the voltage drop values of the current sources of the respective circuit as a characteristic voltage drop value of the circuit;
withdrawing of a respective withdrawal current of the respective circuit from a control bus by each of the at least two circuits, wherein:
an amount of the respective withdrawal current of the respective circuit depends on a deviation of its characteristic voltage drop value from a set value, and
all of the withdrawal currents and at least one optional constant bias current are summed to a total current, and
regulating the output voltage of the current-controlled voltage regulator at its output as a function of the sum current;
wherein:
the amount of the respective withdrawal current of the respective circuit depends linearly on a deviation of its characteristic voltage drop value from a set value, and
the current-controlled voltage regulator is current controlled.

2. A device for supplying several LED groups with electrical energy comprising:
a current-controlled voltage regulator,
at least two circuits,
a voltage-to-current-converter,
a control bus,
a resistor, and
a resistor network,
wherein:
the device comprises multiple LED groups,
the current-controlled voltage regulator generates an output voltage at its output,
the output voltage supplies the LEDs of the LED groups with electrical energy,
each of the at least two circuits has at least one LED connection for more than one LED group,
each of the at least two circuits has more than one LED driver per LED group for the energy supply of the LED group via the LED connection associated with the respective LED group,
each of the at least two circuits has at least one measuring circuit of the circuit for detecting voltage differences between potentials of the LED connections of the circuit and a reference potential,
each of the at least two circuits comprises a local controller, wherein the local controller withdraws a current from the control bus by a driver in dependence on the voltage differences detected by the measuring circuit,
the local controller generates an internal control signal connected to the driver according to an algorithm, by selecting a minimum voltage value from n potential differences between the measured values of the measuring circuit for the potentials at the LED connections of the LED groups of the circuit with respect to the reference potential as the local control value,
for each of the at least two circuits, among the potential difference values determined for that circuit, a potential difference value of the potential difference values of current sources of that circuit is selected as a characteristic potential difference value of that circuit,
each of the at least two circuits extracts an electric current associated therewith, its extraction current, from a control bus,
an amount of the respective extraction current of the respective circuit depends on a deviation of its characteristic potential difference value from a setpoint value,
the setpoint being common to all circuits and thus selected or set to be same for all circuits within a tolerance window,
one or more bias current sources feeds one or more bias currents in form of a sum current of the fed bias currents into the control bus,
the resistor performs a current-to-voltage conversion of the sum current into a control voltage,
the voltage-to-current converter converts the control voltage into a current of a voltage control signal,
the resistor network converts the current of the voltage control signal into a voltage value, and
the output voltage of the current-controlled voltage regulator depends on the voltage value,
the dependence with which the amount of the respective extraction current of the respective circuit depends on the deviation of its characteristic potential difference value from a set value is linear, and
the current-controlled voltage regulator is current controlled.

3. A device for supplying several LED groups with electrical energy, the device comprising:
- a voltage-controlled voltage regulator,
- at least two circuits,
- a control bus, and
- a resistor, wherein
- the device comprises a plurality of LED groups,
- the voltage-controlled voltage regulator generates an output voltage at an output of the voltage-controlled voltage regulator,
- the output voltage supplies the LEDS of the LED groups with electrical energy,
- each of the at least two circuits includes more than one LED terminal for at least one LED group,
- each of the at least two circuits includes more than one LED driver per LED group for supplying power to the LED group via the LED terminal associated with the LED group,
- each of the at least two circuits includes at least one measuring circuit of the circuit for detecting voltage differences between potentials of the LED terminals of the circuit and a reference potential,
- each of the circuits includes a local controller,
- the local controller generates an internal control signal which is connected to a driver, according to an algorithm, by selecting a minimum voltage value from n potential differences between the measured values of the measuring circuit for the potentials at the LED terminals of the LED groups of the circuit with respect to the reference potential as local control value,
- the local controller withdraws a current from the control bus by at least one driver in dependence on the voltage differences detected by its the measuring circuit,
- one or more bias current sources feed one or more respective bias currents into the control bus in form of a sum current of the fed bias currents,
- the resistor performs a current-to-voltage conversion of the sum current into a control voltage, and
- the output voltage of the voltage-controlled voltage regulator depends on the value of the control voltage, and
- the dependence with which the local controller of each of the at least two circuits extracts a current from the control bus by the respective at least one driver as a function of the voltage differences detected by the measuring circuit is linear.

4. A device for supplying several LED groups with electrical energy, the device comprising:
- a current-controlled voltage regulator,
- at least two circuits,
- a control bus, and
- a resistor wherein
- the device comprises a plurality of LED groups,
- the current-controlled voltage regulator generates an output voltage at an output of the current-controlled voltage regulator,
- each of the at least two circuits comprises more than one LED connection for more than one respective LED group,
- each of the at least two circuits includes at least one LED driver per LED group for supplying power to the LED group via the LED connection associated with the LED group,
- each of the at least two circuits includes more than one measuring circuit of the circuit for detecting voltage differences between potentials of LED terminals of the circuit and a reference potential,
- each of the at least two circuits includes a local controller, wherein the local controller withdraws a current from the control bus by at least one driver in dependence on the voltage differences detected by the more than one measuring circuit,
- one or more bias current sources feed one or more bias currents into the control bus in form of a sum current of the fed bias currents,
- the resistor performs a current-to-voltage conversion of the sum current into a control voltage, and
- the output voltage of the current-controlled voltage regulator depends on a value of the sum current,
- the at least one driver of the local controller of a respective circuit of the at least two circuits extracts a current from the control bus in linear dependence on the voltage differences detected by the more than one measuring circuit, and
- the current-controlled voltage regulator is current-controlled.

* * * * *